(12) United States Patent
Offerle et al.

(10) Patent No.: US 10,618,551 B2
(45) Date of Patent: Apr. 14, 2020

(54) CLEARANCE AND PRELOAD ADJUSTMENT FOR STEERING MECHANISM USING PIEZOELECTRIC ELEMENTS

(71) Applicant: Ford Global Technologies, LLC, Dearborn, MI (US)

(72) Inventors: Timothy Gerard Offerle, Saline, MI (US); Michael Puleri, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1057 days.

(21) Appl. No.: 15/011,881

(22) Filed: Feb. 1, 2016

(65) Prior Publication Data

US 2017/0217483 A1   Aug. 3, 2017

(51) Int. Cl.
| | | |
|---|---|---|
| *B62D 6/00* | (2006.01) | |
| *B62D 3/10* | (2006.01) | |
| *B62D 3/12* | (2006.01) | |
| *F16H 57/00* | (2012.01) | |
| *F16H 57/12* | (2006.01) | |
| *F16H 19/04* | (2006.01) | |

(52) U.S. Cl.
CPC ............. *B62D 6/00* (2013.01); *B62D 3/10* (2013.01); *B62D 3/12* (2013.01); *F16H 57/0006* (2013.01); *F16H 57/12* (2013.01); *F16H 19/04* (2013.01); *F16H 2057/123* (2013.01); *F16H 2057/126* (2013.01)

(58) Field of Classification Search
CPC .... B62D 3/10; B62D 3/12; B62D 6/00; F16H 19/04; F16H 57/0006; F16H 57/12; F16H 2057/123; F16H 2057/126

USPC .................................................. 74/409, 440
See application file for complete search history.

(56) References Cited

U.S. PATENT DOCUMENTS

| | | | |
|---|---|---|---|
| 4,716,983 A * | 1/1988 | Adams ..................... | B62D 6/10 180/446 |
| 4,742,883 A | 5/1988 | Duffy | |
| 5,265,487 A | 11/1993 | Williams et al. | |

(Continued)

FOREIGN PATENT DOCUMENTS

| | | |
|---|---|---|
| DE | 102011011823 A1 | 9/2012 |
| JP | 09229787 A | 9/1997 |

(Continued)

*Primary Examiner* — William C Joyce

(57) ABSTRACT

A steering mechanism having a piezoelectric element to adjust component clearance and preload based on steering inputs, road inputs, and time in service. The piezoelectric element positioned in the steering mechanism for electric adjustment so that the clearance and preload can be adjusted electrically in response to steering inputs, road inputs, and time in service. This arrangement allows for low preload and low friction when the vehicle is being driven over smooth road conditions. When a rough road condition is detected both clearance and preload can be electrically increased to minimize noise. The disclosed inventive concept may find application in a variety of steering mechanisms to minimize or eliminate NVH when the vehicle is driven over rough surfaces. Without limitation, the piezoelectric element may be provided in rack and pinion electric power assisted steering systems or in worm and wheel (steering column) electric power assisted steering systems.

11 Claims, 3 Drawing Sheets

(56) References Cited

U.S. PATENT DOCUMENTS

| | | |
|---|---|---|
| 6,681,883 B2 | 1/2004 | Loh et al. |
| 6,725,964 B2 | 4/2004 | Appleyard |
| 7,654,166 B2 | 2/2010 | Heo |
| 8,205,515 B2 | 6/2012 | Robertson et al. |
| 8,739,645 B2 | 6/2014 | Kluge |
| 8,863,599 B2 | 10/2014 | Crossman |
| 2010/0140011 A1* | 6/2010 | Wilkes ................. B62D 5/0409 180/444 |

FOREIGN PATENT DOCUMENTS

| | | |
|---|---|---|
| JP | 03132317 B2 | 2/2001 |
| JP | 2007196831 A | 8/2007 |
| JP | 2009-250260 | * 10/2009 |
| JP | 2012-236565 | * 12/2012 |

* cited by examiner

CLEARANCE AND PRELOAD ADJUSTMENT FOR STEERING MECHANISM USING PIEZOELECTRIC ELEMENTS

TECHNICAL FIELD

The disclosed inventive concept relates to steering mechanisms for automotive vehicles. More particularly, the disclosed inventive concept relates to a steering mechanism that incorporates piezoelectric elements that react to such variables as steering inputs, road inputs, and time in service. In response to this information, the piezoelectric elements can adjust clearance and preload in the steering mechanism thereby minimizing noise.

BACKGROUND OF THE INVENTION

Automotive vehicle steering systems are subject to a great number of forces that may cause noise, vibration and harshness (NVH) heard and felt by the vehicle driver and passengers. Steering NVH is particularly a problem when the vehicle is driving over rough road surfaces, such as cobblestones or Belgian blocks.

Previous efforts to reduce or eliminate steering NVH over rough road surfaces focused on designing and tuning the bushings, bearings and joints used through the steering and suspension systems to achieve a desired level of NVH. Unfortunately, these efforts have had only limited success, and they often require compromise in other vehicle attributes, such as ride, steering feel, rolling comfort and impact harshness.

The problems with steering mechanism NVH encountered when a vehicle is driven over a rough surface are shared by both rack and pinion and worm and wheel steering mechanisms. Being that the rack and pinion steering mechanism is the more common of the two, more research has been directed to solving the problems of this type of mechanism.

For example, DE 10162470A1 is directed to a steering gear for a motor vehicle in which a thrust piece by means of which the toothed rack is pressed against the drive pinion is guided in a longitudinally movable manner within a connecting piece of the steering gear housing. Accordingly, the preload force acts on the thrust piece in such a way that the direction of action of the preloaded force acting on the thrust piece and the movement direction of the thrust piece enclose an angle. The objective of this reference is to prevent rattling noises as a result of alternating contact with the thrust piece.

By way of further example, U.S. Pat. No. 7,654,166 discloses a toothed-rack steering gear having a component which serves to automatically compensate play which exists between surfaces which face toward one another of a spring-loaded thrust piece of a counter bearing against which the spring acting on the thrust piece is supported. According to the invention disclosed in this patent, a two spaced apart, wedge-shaped intermediate components are arranged between the thrust piece and the counter bearing. The wedge-shaped intermediate components are attached to one another by an elastic element. The wedge shape and the force with which the components are attached to one another by the elastic element compensate for play that exists between the thrust piece and the counter bearing.

While these innovations represent improvements in the art of steering mechanisms, a particular challenge faced by steering mechanism designers is that increasing preload between moving components results in reduced NVH but results in other difficulties. Particularly, the amount of preload and clearance in a steering mechanism must be set to provide low friction for good steering without causing mechanical noises during steering inputs or during road inputs. A lower clearance or higher preload results in less noise but results in an undesirable increase in friction.

Complicating engineering development is the fact that the reduction of NVH is not necessary under all conditions. Particularly, under ordinary driving conditions, the increased preload is not necessary. Thus a practical steering mechanism that is selectively adjustable for clearance and preload depending on surface conditions is desirable.

Accordingly, as in so many areas of vehicle technology there is room for improvement related to steering mechanisms in automobiles.

SUMMARY OF THE INVENTION

The disclosed inventive concept overcomes the problems associated with NVH and known steering mechanisms in the event the vehicle is driven over rough surfaces. The disclosed inventive concept provides effective movement of one element of a steering mechanism in relation to another. The movement is caused by one or more piezoelectric elements incorporated into the steering mechanism that adjust component clearance and preload based on road surface and other inputs.

The piezoelectric element positioned in the steering mechanism for electric adjustment so that the clearance and preload can be rapidly adjusted electrically in response to steering inputs, road inputs, and time in service. This arrangement allows for low preload and low friction when the vehicle is being driven over smooth road conditions. When a rough road condition is detected both clearance and preload can be electrically increased to minimize noise.

Active Damping System (CCD) and electric power assisted steering (EPAS) (torque sensor) can potentially detect road surfaces that are known to cause steering NVH including, for example, Cobblestone or Belgian block roads. An integrated active steering gear yoke or an active worm wheel column EPAS yoke can change clearance based on real time feedback of road conditions, via an input over controller area network/local interconnect network (CAN/LIN) or wired signal voltage input. The ability to actively change clearance mitigates NVH while on changing road surfaces.

The disclosed inventive concept may find application in a variety of steering mechanisms to minimize or eliminate NVH when the vehicle is driven over rough surfaces. For example, the piezoelectric element may be provided in rack and pinion EPAS systems or in worm and wheel (steering column) EPAS systems.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
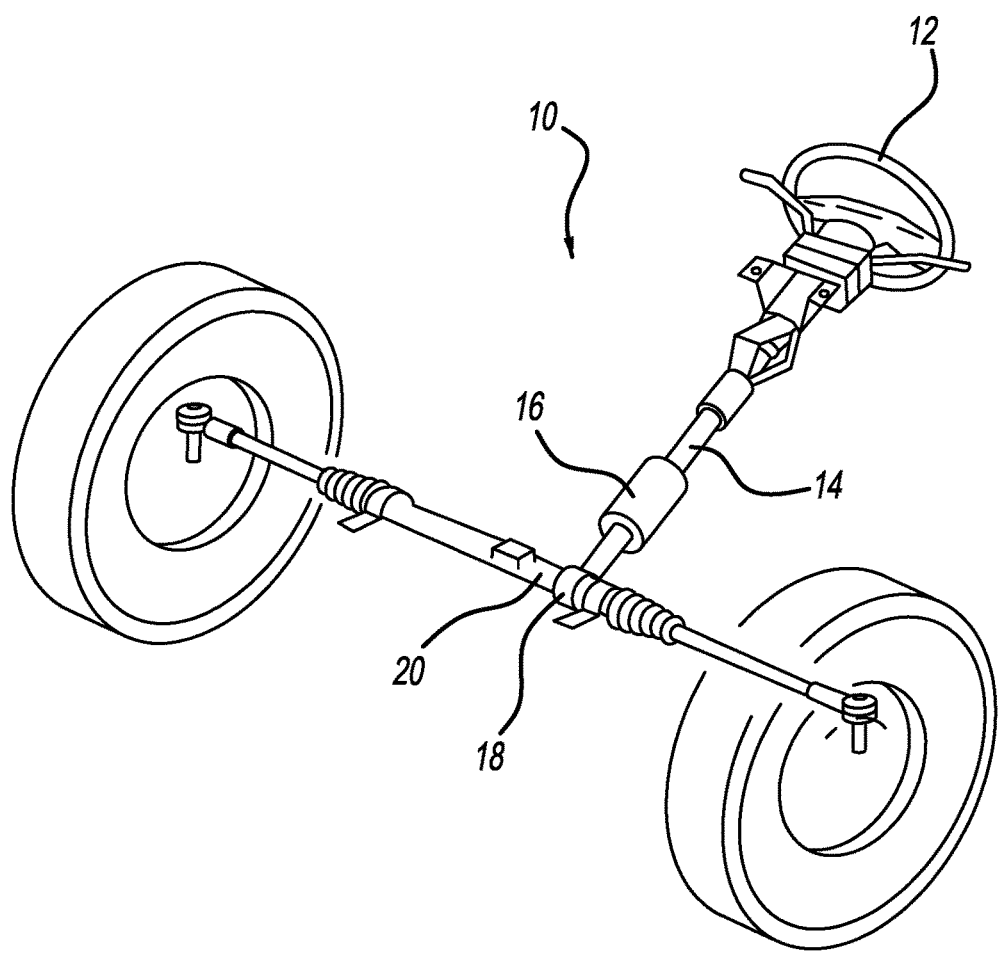
FIG. 1 is a perspective view of a conventional steering system for use in an automotive vehicle.

In the following figures, the same reference numerals will be used to refer to the same components. In the following description, various operating parameters and components are described for different constructed embodiments. These specific parameters and components are included as examples and are not meant to be limiting.

In general, the disclosed invention is related to a steering mechanism having a piezoelectric element positioned in the steering mechanism for electric adjustment so that the clearance and preload can be adjusted electrically in quick response to steering inputs, road inputs, and time in service. This arrangement allows for low preload and low friction when the vehicle is being driven over smooth road conditions. When a rough road condition is detected both clearance and preload can be electrically increased to minimize noise. While the disclosed inventive concept can provide service in a broad array of steering mechanisms, two of the more common mechanisms, a rack and pinion electric power assisted steering system and a worm and wheel (steering column) electric power assisted steering system are discussed herein.

Referring to FIG. 1, a power steering system is generally indicated by reference numeral 10. A steering wheel 12 controllable by the vehicle operator is connected to a steering column 14. It is to be understood that the illustrated power steering system and its component parts are for illustration purposes only and are not intended as being limiting as the disclosed inventive concept can be adapted to a wide variety of steering mechanisms.

The steering column 14 is provided with an electronic power steering (EPS) manual steering gear system 16. The EPS manual steering gear system is operatively connected to a steering gear housing 18 that is integral with a rack housing 20. The steering gear housing 18 is joined with the rack housing 20 and allows interaction between an axially rotatable pinion gear and a linearly movable rack gear, both illustrated in FIG. 2 and discussed in connection therewith.

Figure 2:
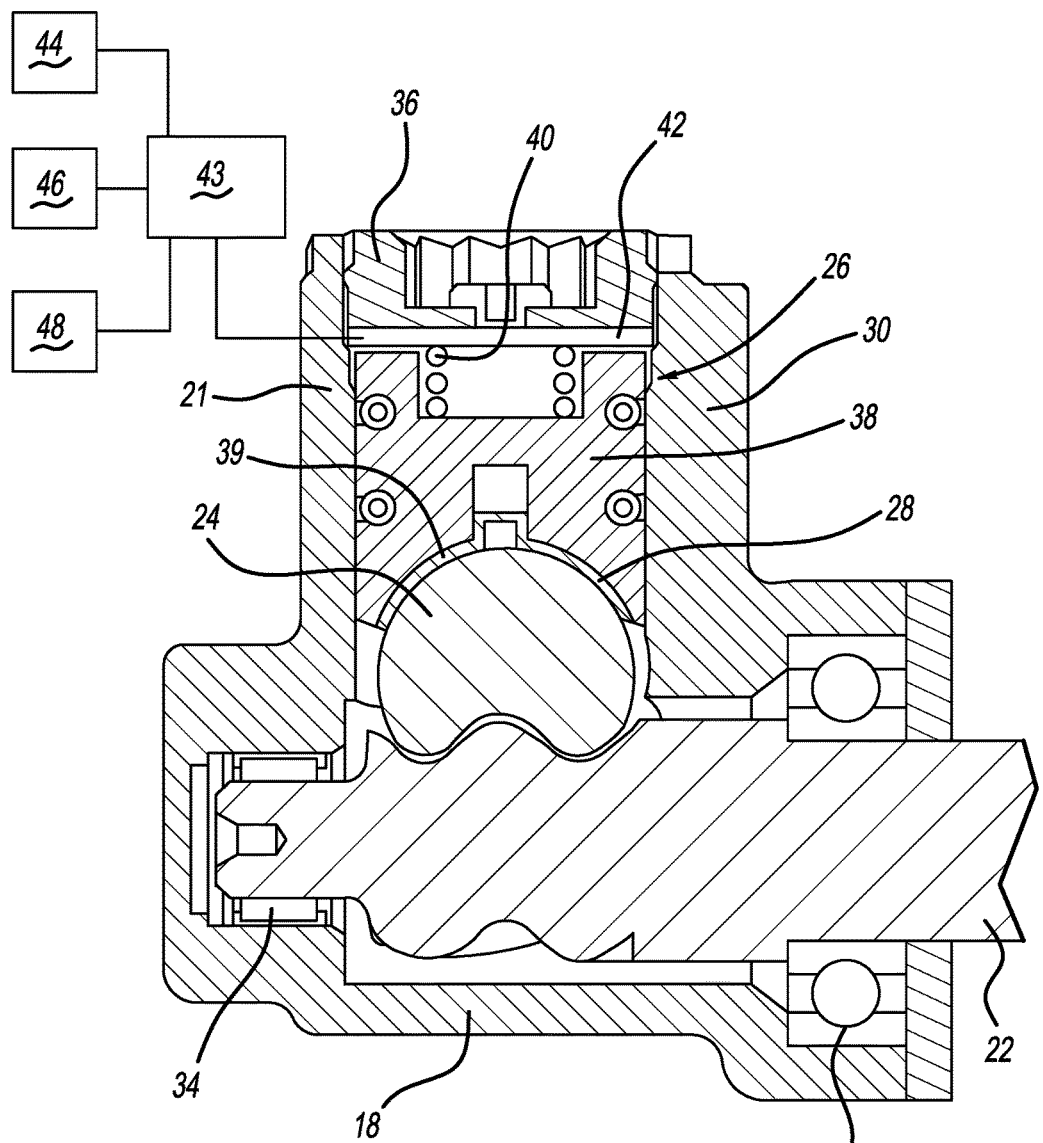
FIG. 2 is a cross-sectional view of a rack and pinion EPAS having a piezoelectric element according to the disclosed inventive concept.

A rack and pinion arrangement having a piezoelectric element according to the disclosed inventive concept is illustrated. The rack and pinion arrangement converts rotational force received from a steering shaft (not shown) into rectilinear motion. As illustrated in FIG. 2, the steering gear housing 18 is shown in a cross-section taken through a pinion gear sleeve 21 that defines an opening for a pinion gear 22. This section is also taken through a rack gear 24, a yoke assembly 26 and a bushing assembly 28. The steering gear housing 18 includes a cylindrical portion 30.

The pinion gear 22 is shown engaging the rack gear 24 with the yoke assembly 26 and bushing assembly 28 supporting the rack gear 24 on the opposite side of the rack gear 24 from its point of engagement with the pinion gear 22. The pinion gear 22 is received at its distal end in the pinion gear end bearing 32. The pinion gear 22 is retained steering gear housing 18 by a nut 34.

An end cap 36 is fitted to the end of the cylindrical portion 30. The yoke assembly 26 includes a bushing interface shaft 38. The bushing interface shaft 38 has a cylindrical shape to enable it to linearly slide within the cylindrical portion 30 of the steering gear housing 18. Thus the end cap 36 acts to both retain the bushing interface shaft 38 as well as to contain lubrication.

The front end of the bushing interface shaft 38 is in contact with the rack gear 24. The front end of the bushing surface shaft 38 has a semicircular groove 39. A portion of the curved rear surface of the rack gear 24 can contact the semicircular groove 39.

A spring 40 is at the underside of the end cap 36. The spring 40 may be a coil spring as illustrated or may be another mechanical biasing element. The spring 40 applies a constant pressure and compensates for clearance between the rack gear 24 and the pinion gear 22. Accordingly, the spring 40 functions to apply pressure to the bushing interface shaft 38, thereby forcing the bushing interface shaft 38 to close contact with the rack gear 24.

A piezoelectric stack 42 having two faces is operatively fitted between the end cap 36 on one of its two faces and the and the spring 40 and the upper end of the spring 40 and the bushing interface shaft 38 on the other of its two faces. Although the piezoelecric stack 42 is illustrated as being a single element, it is to be understood that two or more piezoelectric elements may be employed.

A processing unit 43 is operatively associated with the piezoelectric stack 42. The processing unit 43 is connected with a steering sensor 44 for sensor inputs, a road sensor 46 for road inputs, and a time in service clock 48. The time in service clock 48 takes into consideration the operating life to date of the vehicle, thereby determining and compensating for component wear. Other sensors, such as a sensor for measuring component temperature (not shown), may be connected with the processing unit 43 as required to sense changing road conditions.

In operation, when the vehicle is being driven over a relatively smooth surface, the steering sensor 44 and the road sensor 46 sense the smooth road condition and signal to the processing unit 43 that no electrical energy needs to be sent to the piezoelectric stack 42. However, when there is a change in aspect caused by a rough road, the steering sensor 44 and the road sensor 46 generate appropriate signals for receipt by the processing unit 43 which, in turn, causes electrical energy to be sent to the piezoelectric stack 42. The amount of energy is a function not only of the signals generated by the steering sensor 44 and the road sensor 46, but also of the information generated by the time in service clock 48. It is to be understood that the road condition feedback signal sent from the processing unit to the piezoelectric stack 42 may be sent via an input over controller area network/local interconnect network (CAN/LIN) or wired signal voltage input.

When electrified, the piezoelectric stack 42 applies force against the upper end of the bushing interface shaft 38 thereby adjusting both clearance and preload of the rack gear 24 relative to the pinion gear 22. Movement of the bushing interference shaft 38 is immediately responsive to the inputs generated by the processing unit 43 and both increased pressure and the relief of that pressure is real time and is thus immediate, thereby minimizing or eliminating entirely NVH generated by the steering mechanism as the vehicle is driven over any terrain.

Figure 3:
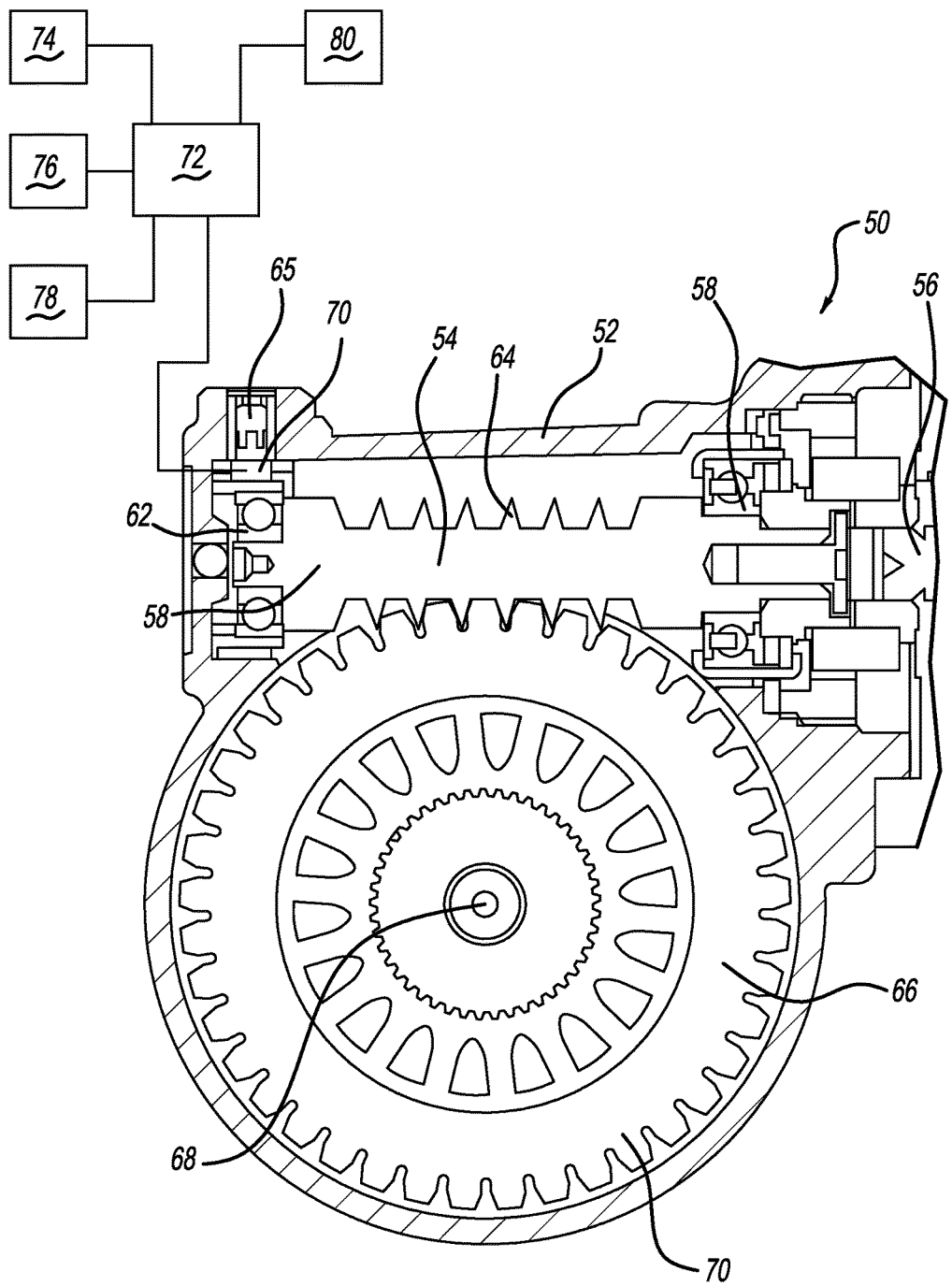
FIG. 3 is a cross-sectional view of a steering column EPAS having a piezoelectric element according to the disclosed inventive concept.

As noted above, the disclosed inventive concept may find applicability in a number of steering mechanisms, including both the above-described rack and pinion electric power assisted steering system but also in a worm and wheel (steering column) electric power assisted steering system. The worm and wheel arrangement is shown in FIG. 3. Referring to that figure, a worm and wheel mechanism, such as the illustrated steering column electric power assisted steering system 50, includes a housing 52. An input shaft 54 is rotatably fitted within the housing 52. The input shaft 54 includes an input end 56 which is conventionally connected to a drive unit such as a motor (not shown). The input end 56 is rotatably supported within the housing 52 by a bearing 58. Opposite the input end 56 of the input shaft 54 is an end 60 that is rotatably supported in the housing 52 by a bearing 62. The input shaft 54 carries a worm gear 64 between bearing 58 and the bearing 62. The bearing 62 is fitted in and partially spaced apart from the housing 52 by a biasing element 65. The biasing element 65 may be made from any of several materials, including spring steel. Movement of the bearing 62 is axially restricted within the housing 52. However, the bearing 62 is radially movable within the housing 52 in response to the biasing force of the biasing element 65.

A toothed wheel 66 is fixedly attached to a rotatable output shaft 68. The worm gear 64 is configured to engage the toothed wheel 66 provided on the output shaft 68. Because of the radial movability of the bearing 62 within the housing 62, the biasing element can bias the input shaft 54 toward the toothed wheel 66.

A torque sensor (not illustrated) is provided and is configured to measure torque in the output shaft 68. The output from the torque sensor produces a motor drive signal via an electronic control unit that controls the torque generated by the motor. Thereafter, the motor transfers torque via the motor's rotor (not shown) to the input shaft 54 and onto the output shaft 68.

A piezoelectric stack 70 having two faces is operatively fitted between the biasing element 65 on one of its two faces and the bearing 62 on the other of its two faces. Although the piezoelectric stack 70 is illustrated as being a single element, it is to be understood that two or more piezoelectric elements may be employed.

A processing unit 72 is operatively associated with the piezoelectric stack 70. The processing unit 72 is connected with a steering sensor 74 for sensor inputs, a road sensor 76 for road inputs, a time in service clock 78, and a temperature sensor 80 for sensing the temperatures of the input shaft 54 and its associated worm gear 64 as well as the toothed wheel 66. The time in service clock 78 takes into consideration the operating life to date of the vehicle, thereby determining and compensating for tooth wear. The temperature sensor 80 enables the piezoelectric stack 70 to adjust for clearance and preload regardless of temperature. It is to be understood that a temperature sensor may be included in any type of steering mechanism according to the disclosed inventive concept. Other sensors as desired may be connected with the processing unit 72 as required to sense changing road conditions.

In operation, when the vehicle is being driven over a relatively smooth surface, the steering sensor 74 and the road sensor 76 sense the smooth road condition and signal to the processing unit 72 that no electrical energy needs to be sent to the piezoelectric stack 70. However, when there is a change in aspect caused by a rough road, the steering sensor 74 and the road sensor 76 generate appropriate signals for receipt by the processing unit 72 which, in turn, causes electrical energy to be sent to the piezoelectric stack 70. The amount of energy is a function not only of the signals generated by the steering sensor 74 and the road sensor 76, but also of the information generated by the time in service clock 78. As with the arrangement for the rack and pinion steering mechanism illustrated in FIG. 2 and discussed in conjunction therewith, it is to be understood that the road condition feedback signal sent from the processing unit to the piezoelectric stack 70 may be sent via an input over controller area network/local interconnect network (CAN/LIN) or wired signal voltage input.

When electrified, the piezoelectric stack 70 applies force against the bearing 62 thereby adjusting both clearance and preload of the input shaft 54 and its worm gear 64 relative to the toothed wheel 66. Movement of the worm gear 64 relative to the toothed wheel 66 is immediately responsive to the inputs generated by the processing unit 72 and both increased pressure and the relief of that pressure is real time and is thus immediate, thereby minimizing or eliminating entirely NVH generated by the steering mechanism in the event that the vehicle is being driven over rough terrain.

The disclosed inventive concept as set forth above overcomes the challenges faced by known arrangements for reducing or eliminating NVH in steering mechanisms when experiencing rough driving conditions. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A steering mechanism for use in a vehicle, the mechanism comprising:
    a gear housing;
    a drive gear;
    a driven gear being driven by said drive gear;
    a piezoelectric element operatively associated with one of said gears;
    a processing unit connected to said piezoelectric element for selectively electrifying said element, said processing unit being connected to a road sensor for identifying a rough road condition,
    wherein said piezoelectric element is energized when said road sensor identifies said rough road condition, and
    wherein said drive gear is an input shaft having a worm gear and said driven gear is a toothed wheel attached to an output shaft.

2. The steering mechanism of claim 1 wherein said processing unit is connected to a time in service clock.

3. The steering mechanism of claim 1 further including a bearing said bearing supporting said input shaft within said housing.

4. The steering mechanism of claim 3 wherein said housing includes an inner wall and said piezoelectric element is fitted between said wall and said bearing.

5. The steering mechanism of claim 4 further including a biasing element.

6. The steering mechanism of claim 5 wherein said piezoelectric element has two faces, said biasing element being disposed against one of said faces and said bearing being disposed against the other of said faces.

7. A steering mechanism for use in a vehicle, the mechanism comprising:
    a housing defining a bore;
    a drive gear;
    a driven gear being driven by said drive gear;
    a piezoelectric element operatively associated with one of said gears;
    a biasing element, said piezoelectric element being positioned between said biasing element and said drive gear; and
    a processing unit connected to said piezoelectric element for selectively electrifying said element, wherein said drive gear is an input shaft having a worm gear and said driven gear is a toothed wheel attached to an output shaft.

8. The steering mechanism of claim 7 wherein said processing unit is connected to one or more sensors selected from the group consisting of a steering sensor, a road sensor and a temperature sensor.

9. The steering mechanism of claim 8 wherein said processing unit is connected to a time in service clock.

10. The steering mechanism of claim 7 further including a bearing said bearing supporting said input shaft within said housing and wherein said housing includes an inner wall, said piezoelectric element is fitted between said wall and said bearing.

11. A steering mechanism for a vehicle, the mechanism comprising:
 a housing;
 a first movable component, said first movable component being an input shaft having a gear;
 a second movable component operatively associated with said first movable component, said second movable component being a wheel attached to an output shaft;
 a piezoelectric element operatively associated with one of said movable components;
 a processing unit connected to said element for selectively electrifying said element, said unit being connected to a road sensor for identifying a rough road condition,
 wherein said piezoelectric element is energized when said road sensor identifies said rough road condition.

* * * * *